Patented Aug. 30, 1938

2,128,247

UNITED STATES PATENT OFFICE 2,128,247

PROCESS OF TREATING CASHEW NUT SHELL LIQUID

Mortimer T. Harvey, East Orange, and Frederick M. Damitz, Irvington, N. J., assignors, by direct and mesne assignments, to The Harvel Corporation, a corporation of New Jersey No Drawing. Application March 7, 1934, Serial No. 714,448

5 Claims. (Cl. 260—424)

The present invention relates to methods and steps for modifying the juices of trees and shrubs of the Anacardiaceae family such, for example, as cashew nut shell liquid and the juice of *Rhus vernicifera* for the purpose of changing them from the natural skin vesicating state to a state in which they are free from this characteristic, and the present invention also relates to the modified cashew nut shell liquid and other juices in the non-vesicating condition and to method and steps for the use thereof.

It is well known that cashew nut shell liquid and the juice of *Rhus vernicifera* in the natural condition contain elements or radicals in combinations which cause a vesicant action on the human skin when they come in contact with the same. The vesicant effect, although it is temporary and leaves no harmful after effects, is highly disagreeable and uncomfortable in some cases and is usually accompanied by swelling and itching.

We have discovered that the poisonous or vesicating juices such as cashew nut shell liquid, marking nut shell liquid, the juice of *Rhus vernicifera*, the juice of the poison ivy plant (*Rhus vernix*), and so on contain sulphur, apparently in a sulphide combination, and we have further discovered that the combinations which cause the poisoning or vesicant action are altered or destroyed when the juice, such as cashew nut shell or any of the others, is treated to modify, to destroy or to remove therefrom the natural sulphide content. As a result the irritating or vesicating action on the human skin is eliminated. Various methods and steps for the treatment of these juices such, for example, as cashew nut shell liquid, to secure this modification are described below together with a disclosure of the characteristics of the modified product and of steps of using said product.

An object of the present invention is to provide a general method of treating cashew nut shell liquid or other Anacardiaceae juice for the purpose of modifying the same from the natural vesicant condition to a non-vesicant condition.

Another object of the present invention is to provide methods of removing or destroying the natural sulphide content from cashew nut shell liquid or other Anacardiaceae juices.

Another object of the present invention is to provide modified Anacardiaceae juice such, for example, as cashew nut shell liquid products which are free from the vesicant action characteristic of cashew nut shell liquid or other juice in the natural state.

Another object of the present invention is to provide a method for removing or destroying the sulphide content of cashew nut shell liquid and still have said liquid in a form applicable to and usable in the several arts in which it is useful in the natural condition.

Other objects of the present invention will be apparent from the following description of products and methods and steps for preparing and using the same.

According to my present invention, and as an illustrative example of a method of practicing the invention, cashew nut shell liquid is freed of its naturally occurring sulphide content by heating with a small quantity of a reagent which will react with the sulphide sulphur or with the radical in which said sulphur occurs. Illustrative examples of material found suitable for breaking off the naturally occurring sulphide sulphur from cashew nut shell liquid are as follows: sulphuric acid, hydrochloric acid, phosphoric acid, acetic acid, sodium acid phosphate, lead acetate and chlorine gas. A particular example is as follows: A given weight of dehydrated raw cashew nut shell liquid has added to it two and one-half (2½%) per cent of its weight in concentrated sulphuric acid and five (5%) per cent of its weight in water, and the mixture emulsified by stirring. The emulsion is then heated to about 195° C. to drive off resulting hydrogen sulfide gas and held at this temperature until a somewhat stringy body is obtained whereupon it is cooled and is suitable for use (alone or with drying oils or otherwise), with driers, formaldehyde and so on as described in the patents of Mortimer T. Harvey, Nos. 1,725,791 to 1,725,795, issued August 27, 1929 and others issued since that date. For illustrative example, the heated emulsion as above described can be chilled back with two-thirds of a part of linseed oil, carried up to about 300° C. and about 2½% litharge added, and again chilled back with one-third part of linseed oil. At about 325° F. this varnish mixture is thinned with a solvent such as high flash naphtha or Varnoline to a desired solids content, e. g., about 50%.

An illustrative example in which both sulphuric acid and hydrochloric acid are used is as follows: To a given quantity of cashew nut shell liquid are added the following material, in proportionate amounts by weight of the cashew nut shell liquid: hydrochloric acid (specific gravity 1.2), about five per cent; sulphuric acid (specific gravity 1.8), about one-half of one per cent; and water, about five per cent. The materials are stirred with a mechanical mixer to form an emulsion which is then heated under a reflux condenser for about two and one-half hours at about 110° C. to drive off the sulphide sulphur as hydrogen sulphide gas which passes out through the reflux condenser. The material thus treated is then cooled and is ready for use for any purpose for which cashew nut shell liquid is suitable, for example, for uses and methods disclosed in my Patent Numbers 1,725,791 to 1,725,797, inclusive, issued August 27, 1929 and others issued since then.

Likewise, sulphuric acid alone is used for dissociating the sulphur from cashew nut shell liquid, for example to a quantity of cashew nut shell liquid there is added about two and one-half per cent of the weight thereof in sulphuric acid (specific gravity 1.8) and the two mixed together and heated up to about 150° C. during which the combined sulphur in the cashew nut shell liquid is broken off and driven off as hydrogen sulphide gas. The product of this reaction is a fairly thick polymer which can be cut with a solvent and/or a drying oil such as linseed or China-wood oil to be made up into a varnish or coating. Or, it can be heated further, for example at about 120° C. and thickened further into a polymer similar to rubber. This polymer is suitable for setting or vulcanizing with sulphur which can be milled into it for use as a rubber substitute or it can be milled into rubber to give rubber products the qualities of oil, acid and alkali resistance which it has. Also, the product of this reaction can be set with hexamethylenetetramine or with paraformaldehyde. It is specially noted that the addition of sulphur to the modified cashew nut shell liquid, that is, to cashew nut shell liquid from which the naturally occurring sulphur content has been removed, does not return the material to its former and natural vesicating state or otherwise affect it in this respect. The material remains free of the vesicating characteristic.

Another example, in which hydrochloric acid is used to break off the sulphide sulphur and form hydrogen sulphide therefrom, is as follows: To a given quantity of commercial cashew nut shell liquid about five per cent of the volume of the cashew nut shell liquid in hydrochloric acid (specific gravity 1.18) is added and stirred in with a mechanical stirrer to form an emulsion. The emulsion is heated under a reflux condenser for about two to three hours at about 100° to 110° C. to change the sulphide sulphur of the cashew nut shell liquid to hydrogen sulphide gas which is driven off through the condenser. The resulting product is a non-drying liquid which has the properties of cashew nut shell liquid generally but is free of the vesicating action characteristic of the latter.

Also as an illustrative example, the natural sulphur content of cashew nut shell liquid can be broken off with chlorine which is blown into the cashew nut shell liquid over a period of time to react with the sulphur.

After the treatment for removing the sulphide sulphur, the cashew nut shell liquid can be tested for completeness of the reaction by the following method. Twenty-five grams of treated cashew nut shell liquid, twenty-five grams of a high boiling point solvent free from sulphur compounds (tetraline, for example), and five cubic centimeters of eighty-five per cent orthophosphoric acid are boiled together under a reflux condenser for about thirty minutes. The solvent, tetraline for example, can be omitted. A tube from the top of the reflux condenser leads the vapors into five cubic centimeters of a ten percent lead acetate solution (either in water or glacial acetic acid). At the end of the thirty minutes the heating is discontinued and a slow stream of air passed through the system for about a minute from the boiling flask, through the condenser and into the lead acetate to carry any hydrogen sulphide gas into the latter. Cashew nut shell liquid treated for removing the sulphide content and which under test as above showed absence of sulphide was spotted on the arms of several persons known to be sensitive to cashew nut shell liquid itch but no itch appeared or was felt nor any other manifestations characteristic of cashew vesication. By this method of testing the steps selected from the above, or developed, for removing the sulphide from cashew nut shell liquid can be controlled and regulated to obtain optimum results both as to freeing the cashew nut shell liquid of the vesicating characteristics and for obtaining the treated cashew nut shell liquid in a condition to suit any one or more of various uses of cashew nut shell liquid in the arts. If an excess of acid is used in the deitching process a degree of acid burn or reddening on the skin might result, but this can be avoided by neutralizing the excess acid, for example with caustic soda solution.

When cashew nut shell liquid and other Anacardiaceae liquid above identified are treated with sulphuric acid or with some of the other treating chemicals above disclosed, metals naturally occurring in the liquid being treated, for example, cashew nut shell liquid, are precipitated in combination with the salt radical of the chemical used, for example as metal sulphates. For some purposes this precipitate can be left in the treated liquid, but generally this precipitate is removed as by means of a filter press or with a centrifuge, this being possible with the finally treated cashew nut shell liquid when the smaller percentages of acid are used because the product is a liquid, as above shown by example. When larger proportions of acid are used and the final product is viscous the separation of the precipitate can be done before all the acid is added.

The present application is a continuation in part of our copending application Serial Number 620,551, filed July 1, 1932.

What we claim and desire to protect by Letters Patent is:

1. The method of treating cashew nut shell liquid to remove the natural sulphide sulphur combination therein which comprises reacting with an acid in an amount equivalent to about 1% to 5% of the volume of the cashew nut shell liquid in concentrated sulphuric acid, in the presence of sufficient water to prevent oxidation of the cashew nut shell liquid by the sulphuric acid, and heating to drive off the water, to bring about reaction of the sulphuric acid with the sulphide content and to form and drive off hydrogen sulphide, and to bring about a polymerizing reaction on the cashew nut shell liquid.

2. The method of treating cashew nut shell liquid to remove the vesicant action characteristic thereof which comprises mixing therewith about 1% to 5% by volume of concentrated sulphuric acid and dispersing the two said materials throughout each other with water, heating to effect a reaction involving the natural sulphide content of the cashew nut shell liquid whereby substantially all of said natural sulphide content is evolved in the form of hydrogen sulphide gas, the water being used in sufficient quantity to prevent oxidation of the cashew nut shell liquid by the sulphuric acid.

3. The method which comprises dispersing sulphuric acid into marking nut shell liquid with the aid of a diluent which is miscible with sulphuric acid, the amount of sulphuric acid itself being not more than 6% of the weight of the cashew nut shell liquid, the diluent being in sufficient quantity to prevent oxidation of the cashew nut shell liquid by the sulphuric acid, then heating to the extent and for the length of time that naturally occurring sulphide sulphur content is removed as $H_2S$ and to remove sufficient of the diluent to promote polymerizing action of the sulphuric acid on the cashew nut shell liquid.

4. The method of treating cashew nut shell liquid which comprises removing the naturally occurring sulphide sulphur content thereof by reacting with an acid in an amount equivalent to about 1% to 5% of the volume of the cashew nut shell liquid in concentrated sulphuric acid in the presence of water, heating to effect a reaction involving the natural sulphide content of the cashew nut shell liquid and the evolution thereof as hydrogen sulphide gas, and removing any precipitate, the water being used in sufficient quantity to prevent oxidation of the cashew nut shell liquid by the sulphuric acid.

5. A process comprising reacting the skin vesicating juices of trees and shrubs of the Anacardiceae family for the purpose of reducing the vesicant action thereof which comprises dispersing sulphuric acid into said juice with the aid of a diluent which is miscible with sulphuric acid, the amount of sulphuric acid itself being not more than 6% of the volume of said juice, the diluent being in sufficient quantity to prevent oxidation of said juice by the sulphuric acid, then heating to the extent and for such length of time that naturally occuring sulphide sulphur content is removed as $H_2S$ and until polymerizing action of the sulphuric acid on said juice takes place.

MORTIMER T. HARVEY.
FREDERICK M. DAMITZ.